(12) United States Patent
Rosén et al.

(10) Patent No.: US 12,281,811 B2
(45) Date of Patent: Apr. 22, 2025

(54) CONTROLLING OF A THERMAL ENERGY DISTRIBUTION SYSTEM

(71) Applicant: E.ON SVERIGE AB, Malmo (SE)

(72) Inventors: Per Rosén, Lund (SE); Jacob Skogström, Lomma (SE); Fredrik Rosenqvist, Helsingborg (SE); Bengt Lindoff, Bjarred (SE)

(73) Assignee: E.ON SVERIGE AB, Malmo (SE)

( * ) Notice: Subject to any disclaimer, the term of this patent is extended or adjusted under 35 U.S.C. 154(b) by 990 days.

(21) Appl. No.: 17/309,564

(22) PCT Filed: Dec. 3, 2019

(86) PCT No.: PCT/EP2019/083403
§ 371 (c)(1),
(2) Date: Jun. 4, 2021

(87) PCT Pub. No.: WO2020/115008
PCT Pub. Date: Jun. 11, 2020

(65) Prior Publication Data
US 2021/0381715 A1    Dec. 9, 2021

(30) Foreign Application Priority Data
Dec. 7, 2018    (EP) .................................... 18210957

(51) Int. Cl.
*F24F 11/67*    (2018.01)
*F24D 3/18*    (2006.01)
(Continued)

(52) U.S. Cl.
CPC ................ *F24F 11/67* (2018.01); *F24D 3/18* (2013.01); *F24D 10/003* (2013.01);
(Continued)

(58) Field of Classification Search
CPC .. F24F 11/67; F24F 11/81; F24F 11/83; F24F 11/84; F24F 11/85; F24F 11/86;
(Continued)

(56) References Cited

U.S. PATENT DOCUMENTS 5,953,926 A      9/1999   Dressler et al.
10,101,730 B2 *  10/2018  Wenzel ................. G06Q 10/06
(Continued)

FOREIGN PATENT DOCUMENTS

CN    102460024 A    5/2012
CN    103994615      8/2016
(Continued)

OTHER PUBLICATIONS

International Search Report and Written Opinion of PCT/EP2019/083403, Dated Dec. 2, 2020, in 9 pages.

*Primary Examiner* — Daniel Samwel
(74) *Attorney, Agent, or Firm* — Knobbe, Martens, Olson & Bear, LLP

(57) ABSTRACT

The present invention relates to a method for controlling setting of reversible heat pump assemblies (100) of a district thermal energy distribution system (1) in either a heating mode or a cooling mode. The method comprises: determining, at a control server, a first set of the reversible heat pump assemblies (100) to be set in the heating mode during a future time period; determining, at the control server, a second set of the reversible heat pump assemblies (100) to be set in the cooling mode during the future time period, wherein the second set of the reversible heat pump assemblies (100) is separate from the first set of the reversible heat pump assemblies (100); sending, from the control server (200) to the reversible heat pump assemblies (100) of the first set of the reversible heat pump assemblies (100), a respective control message to set the respective reversible heat pump assembly (100) in the heating mode for the future (Continued)

time period; sending, from the control server (200) to the reversible heat pump assemblies (100) of the second set of the reversible heat pump assemblies (100), a respective control message to set the respective reversible heat pump assembly (100) in the cooling mode for the future time period; and setting the respective reversible heat pump assembly (100) in either the heating mode or the cooling mode for the future time period.

13 Claims, 4 Drawing Sheets

(51) Int. Cl.
*F24D 10/00* (2022.01)
*F24F 5/00* (2006.01)
*G05B 19/042* (2006.01)

(52) U.S. Cl.
CPC .......... *F24F 5/0003* (2013.01); *G05B 19/042* (2013.01); *F24D 2200/12* (2013.01); *F24D 2200/13* (2013.01); *F24F 2221/54* (2013.01); *G05B 2219/2614* (2013.01)

(58) Field of Classification Search
CPC ...... F24F 11/87; F24F 5/0003; F24F 2221/54; F24D 3/18; F24D 10/003; F24D 2200/12; F24D 2200/13; G05B 19/042; G05B 2219/2614

See application file for complete search history.

(56) References Cited

U.S. PATENT DOCUMENTS

| | | | | |
|---|---|---|---|---|
| 10,770,996 | B1* | 9/2020 | Waun | H02P 23/14 |
| 2003/0019230 | A1* | 1/2003 | Gether | F24F 5/0017 |
| | | | | 62/238.7 |
| 2013/0204439 | A1* | 8/2013 | Scelzi | G05B 11/01 |
| | | | | 702/61 |
| 2016/0348936 | A1* | 12/2016 | Johnson, Jr. | G05B 15/02 |
| 2016/0352125 | A1* | 12/2016 | Choi | H02J 7/0063 |
| 2017/0089625 | A1* | 3/2017 | Wallace | F25B 49/00 |
| 2018/0031285 | A1* | 2/2018 | Thomas | F25B 21/04 |

FOREIGN PATENT DOCUMENTS

| | | |
|---|---|---|
| CN | 105180513 | 4/2018 |
| CN | 108474566 | 4/2020 |
| GB | 2544063 | 5/2017 |
| SE | 0003855 | 6/2002 |
| SE | 532189 | 11/2009 |
| WO | WO 2002/35154 | 5/2002 |
| WO | WO 2009/139699 | 11/2009 |
| WO | WO 2010/145040 | 12/2010 |

\* cited by examiner

CONTROLLING OF A THERMAL ENERGY DISTRIBUTION SYSTEM

TECHNICAL FIELD

The present invention relates to controlling of reversible heat pump assemblies in a thermal energy distribution system.

BACKGROUND

Nearly all large developed cities in the world have at least two types of energy grids incorporated in their infrastructures; one grid for providing electrical energy and one grid for providing space heating and hot tap water preparation. Today a common grid used for providing space heating and hot tap water preparation is a gas grid providing a burnable gas, typically a fossil fuel gas. The gas provided by the gas grid is locally burned for providing space heating and hot tap water. An alternative for the gas grid for providing space heating and hot tap water preparation is a district heating grid. Also the electrical energy of the electrical energy grid may be used for space heating and hot tap water preparation. Also the electrical energy of the electrical energy grid may be used for space cooling. The electrical energy of the electrical energy grid is further used for driving refrigerators and freezers.

Accordingly, traditional building heating and cooling systems use primary high grade energy sources such as electricity and fossil fuels or an energy source in the form of industrial waste heat to provide space heating and/or cooling, and to heat or cool water used in the building. Furthermore, it has been increasingly common to also install a district cooling grid in cities for space cooling. The process of heating or cooling the building spaces and water converts this high grade energy into low grade waste heat with high entropy which leaves the building and is returned to the environment.

Hence, there is a need for improvements in how to provide heating and cooling to a city.

SUMMARY OF THE INVENTION

It is an object of the present invention to solve at least some of the problems mentioned above.

According to a first aspect a method for controlling a district thermal energy distribution system is provided. The thermal energy distribution system comprising: a distribution grid for a liquid based distribution of heating and cooling, the distribution grid comprising a hot conduit configured to allow heat transfer liquid of a first temperature to flow therethrough and a cold conduit configured to allow heat transfer liquid of a second temperature to flow therethrough, the second temperature is lower than the first temperature; a control server; and a plurality of reversible heat pump assemblies connected to the distribution grid. Each reversible heat pump assembly comprises: a heat pump having a first side and a second side, the heat pump being configured to transfer heat from the first side to the second side or vice versa, the heat pump being configured to allow heat transfer liquid from the distribution grid to flow through the first side, and to allow heat transfer liquid of either one or more local heating circuits or one or more local cooling circuits to flow through the second side, wherein the reversible heat pump assembly is configured to be selectively set in either a heating mode or a cooling mode, wherein in the heating mode: heat transfer liquid is allowed to flow from the hot conduit of the distribution grid through the first side and to the cold conduit of the distribution grid, and the heat pump is configured to transfer heat from the first side to the second side, wherein in the cooling mode: heat transfer liquid is allowed to flow from the cold conduit of the distribution grid through the first side and to the hot conduit of the distribution grid, and the heat pump is configured to transfer heat from the second side to the first side, and a heat pump assembly mode controller configured to set the reversible heat pump assembly in either the heating mode or the cooling mode. The method comprises: determining, at the control server, a first set of the plurality of reversible heat pump assemblies to be set in the heating mode during a future time period; determining, at the control server, a second set of the plurality of reversible heat pump assemblies to be set in the cooling mode during the future time period, wherein the second set of the plurality of reversible heat pump assemblies is separate from the first set of the plurality of reversible heat pump assemblies; sending, from the control server to the heat pump assembly mode controllers of the reversible heat pump assemblies of the first set of the plurality of reversible heat pump assemblies, a respective control message to set the respective reversible heat pump assembly in the heating mode for the future time period; sending, from the control server to the heat pump assembly mode controllers of the reversible heat pump assemblies of the second set of the plurality of reversible heat pump assemblies, a respective control message to set the respective reversible heat pump assembly in the cooling mode for the future time period; and setting, by the respective heat pump assembly mode controller and in response to receiving the respective control message, the respective reversible heat pump assembly in either the heating mode or the cooling mode for the future time period.

The wording "selectively set in either a heating mode or a cooling mode" should be construed as the reversible heat pump assembly is at one point in time set in the heating mode and at another point in time set in the cooling mode.

The present method allows for optimization of outtake of heat and cold from the district thermal energy distribution system. This since some of the reversible heat pump assemblies are in a controlled manner set in the heating mode and some other of the reversible heat pump assemblies are at the same time in a controlled manner set in the cooling mode.

Further the present method allows for balancing heating and cooling outtake from reversible heat pump assemblies within a sub-portion of the district thermal energy distribution system.

Moreover, according to the present method the setting of the heating mode or cooling mode is made for a predetermined time period "the future time period". By this an optimized and smooth operation of the district thermal energy distribution system may be provided.

The method may further comprise determining an amount of heating and an amount of cooling for the reversible heat pump assemblies delivered over a past time period. The acts of determining the first set of the plurality of reversible heat pump assemblies and determining the second set of the plurality of reversible heat pump assemblies may be based on the determined amount of heating and the determined amount of cooling delivered by the reversible heat pump assemblies over the past time period.

The method may further comprise, for a time period, determining a heating demand from the one or more local heating circuits of the plurality of reversible heat pump assemblies, and determining a cooling demand from the one or more local cooling circuits of the plurality of reversible heat pump assemblies. The acts of determining the first set of the plurality of reversible heat pump assemblies and determining the second set of the plurality of reversible heat pump assemblies may be based on the determined heating and cooling demands. The time period during which the acts of determining a heating demand from the one or more local heating circuits of the plurality of reversible heat pump assemblies, and determining a cooling demand from the one or more local cooling circuits of the plurality of reversible heat pump assemblies may be an already passed time period. The time period during which the acts of determining a heating demand from the one or more local heating circuits of the plurality of reversible heat pump assemblies, and determining a cooling demand from the one or more local cooling circuits of the plurality of reversible heat pump assemblies may be a time period to-be.

The future time period may be at least 10 minutes.

Upon set in the heating mode for the future time period, the respective reversible heat pump assembly may be prohibited to be set in the cooling mode.

Upon set in the cooling mode for the future time period, the respective reversible heat pump assembly may be prohibited to be set in the heating mode.

According to a second aspect a control server for controlling setting of reversible heat pump assemblies of a district thermal energy distribution system in either a heating mode or a cooling mode is provided. The control server comprises: a transceiver configured to communicate with the reversible heat pump assemblies; and a control circuit. The control circuit is configured to: determine, by a heating mode determining function, a first set of the reversible heat pump assemblies of the reversible heat pump assemblies to be set in a heating mode for a future time period; determine, by a cooling mode determining function, a second set of the reversible heat pump assemblies of the reversible heat pump assemblies to be set in a cooling mode for the future time period, wherein the second set of the reversible heat pump assemblies is separate from the first set of the reversible heat pump assemblies; generate, by a messaging function, control messages for the reversible heat pump assemblies of the first and second sets; and send, by the messaging function, the control messages to the reversible heat pump assemblies of the first and second sets.

The control server may further comprise a memory. The control circuit may further be configured to: register, in the memory and by a heating consumption determining function, time resolved data relating to heating delivered by one or more of the reversible heat pump assemblies; determine, by the heating consumption determining function, an amount of heating for one or more of the reversible heat pump assemblies delivered over a past time period. Wherein the heating mode determining function may be configured to base the determining of the first set of reversible heat pump assemblies on the, over the past time period, determined amount of heating delivered by the one or more reversible heat pump assemblies.

The control circuit may further be configured to: register, in the memory and by a cooling consumption determining function, time resolved data relating to cooling delivered by one or more of the reversible heat pump assemblies; and determine, by the cooling consumption determining function, an amount of cooling for one or more of the reversible heat pump assemblies delivered over the past time period. Wherein the cooling mode determining function may be configured to base the determining of the second set of reversible heat pump assemblies on the, over the past time period, determined amount of cooling delivered by the one or more reversible heat pump assemblies.

The control circuit may further be configured to determine, for a time period and by a heating demand determining function, heating demands from local heating circuits of the reversible heat pump assemblies. Wherein the heating mode determining function may be configured to base the determining of the first set of reversible heat pump assemblies on heating demands determined by the heating demand determining function.

The control circuit may further be configured to determine, for a time period and by a cooling demand determining function, cooling demands from local cooling circuits of the reversible heat pump assemblies. Wherein the cooling mode determining function may be configured to base the determining of the second set of reversible heat pump assemblies on cooling demands determined by the cooling demand determining function.

The above mentioned features of the method, when applicable, apply to this second aspect as well. In order to avoid undue repetition, reference is made to the above.

According to a third aspect a district thermal energy distribution system is provided. The district thermal energy distribution system comprises: a distribution grid for a liquid based distribution of heating and cooling, the distribution grid comprising a hot conduit configured to allow heat transfer liquid of a first temperature to flow therethrough and a cold conduit configured to allow heat transfer liquid of a second temperature to flow therethrough, the second temperature is lower than the first temperature; a plurality of reversible heat pump assemblies connected to the distribution grid, wherein each reversible heat pump assemblies is configured to be selectively set in either a heating mode or a cooling mode by a heat pump assembly mode controller; and a control server according to the second aspect.

Each reversible heat pump assembly may comprise a heat pump having a first side and a second side, the heat pump being configured to transfer heat from the first side to the second side or vice versa, the heat pump being configured to allow heat transfer liquid from the distribution grid to flow through the first side, and to allow heat transfer liquid of either one or more local heating circuits or one or more local cooling circuits to flow through the second side. Wherein in the heating mode: heat transfer liquid is allowed to flow from the hot conduit of the distribution grid through the first side and to the cold conduit of the distribution grid, and the heat pump is configured to transfer heat from the first side to the second side. Wherein in the cooling mode: heat transfer liquid is allowed to flow from the cold conduit of the distribution grid through the first side and to the hot conduit of the distribution grid, and the heat pump is configured to transfer heat from the second side to the first side.

The reversible heat pump assembly is simple to connect to the thermal energy circuit being part of a district thermal energy distribution system. The reversible heat pump assembly provide for the use of the same assembly for delivering both heating and cooling. At one point in time the reversible heat pump assembly may be set in the heating mode and at another point in time the reversible heat pump assembly may be set in the cooling mode. By the present reversible heat pump assembly, the utilization of the heat pump assembly may be increased as compared with a dedicated heating or cooling heat pump assembly. The construction of a heating/cooling system in a building may be simplified since only one single heat pump assembly is needed. Further, the controlling of a heating/cooling system in a building may be simplified since only one single heat pump assembly needs to be controlled.

The plurality of reversible heat pump assemblies may be arranged in different buildings.

The basic idea of the district thermal energy distribution system is based on the insight by the inventors that modern day cities by themselves provide thermal energy that may be reused within the city. The reused thermal energy may be picked up by the district thermal energy distribution system and be used for e.g. space heating or hot tap water preparation. Moreover, increasing demand for space cooling will also be handled within the district thermal energy distribution system. Within the district thermal energy distribution system buildings within the city are interconnected and may in an easy and simple way redistribute low temperature waste energy for different local demands. Amongst other the district thermal energy distribution system will provide for:

- Minimizing the use of primary energy due to optimal re-use of energy flows inside the city.
- Limiting the need for chimneys or firing places inside the city, since the need for locally burning gas or other fuels will be reduced.
- Limiting the need for cooling towers or cooling convectors inside the city, since excess heat produced by cooling devices may be transported away and reused within the district thermal energy distribution system.

Hence, the district thermal energy distribution system provides for a smart duel use of thermal energy within a city. When integrated into a city the district thermal energy distribution system makes use of low level thermal energy waste in both heating and cooling applications within the city. This will reduce the primary energy consumption of a city by eliminating the need for a gas grid or a district heating grid and a cooling grid in city.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures showing embodiments. The figures should not be considered limiting; instead they are used for explaining and understanding.

As illustrated in the figures, the sizes of layers and regions may be exaggerated for illustrative purposes and, thus, are provided to illustrate the general structures of embodiments. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
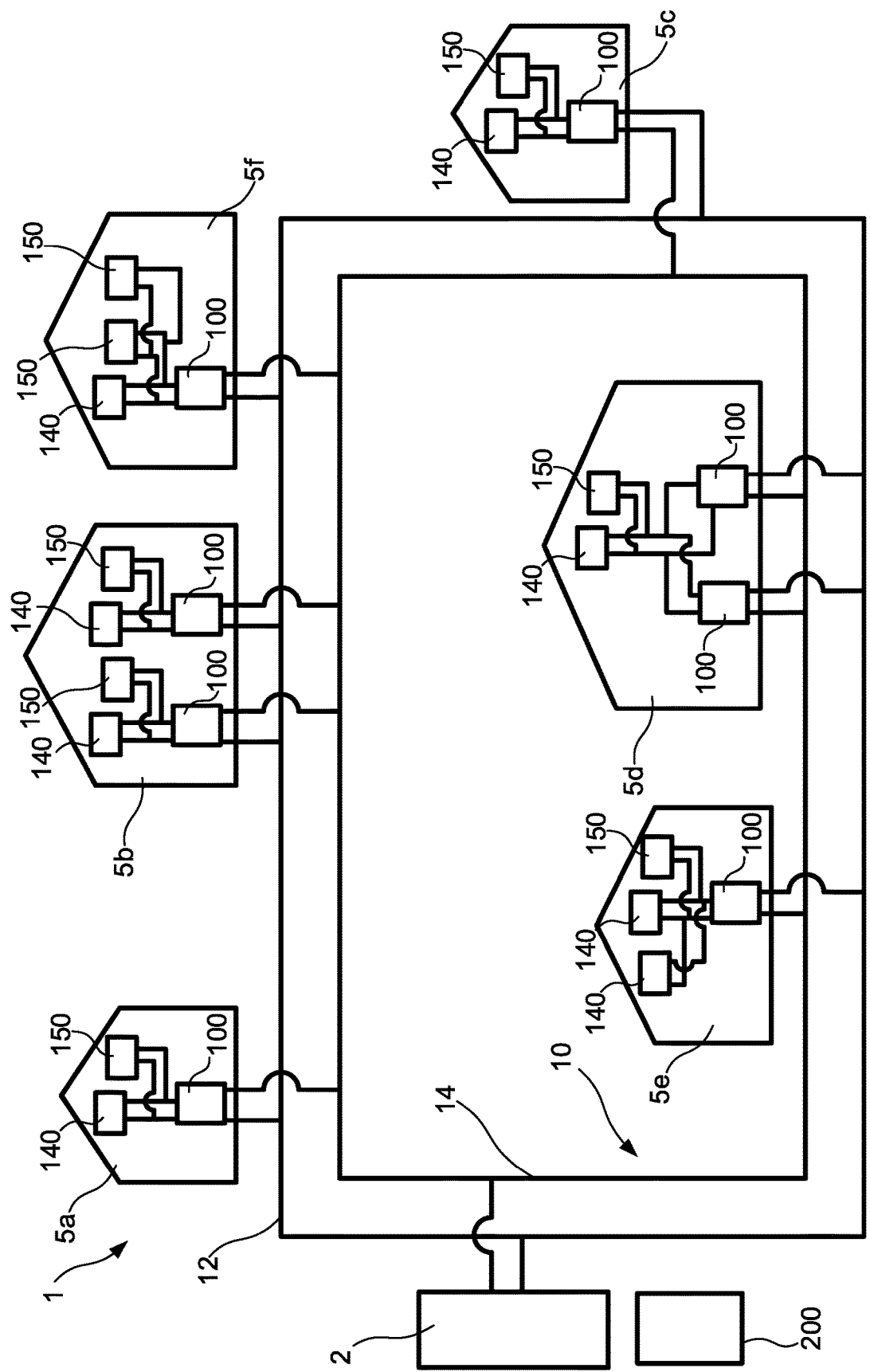
FIG. 1 is a schematic diagram of a district thermal energy distribution system.

FIG. 1 illustrates a district thermal energy distribution system 1. The district thermal energy distribution system 1 comprises a distribution grid 10 and a plurality of buildings 5. The distribution grid 10 is configured to interconnect the buildings 5 such that thermal energy in the form of heating and/or cooling may be distributed to and/or from the buildings 5. Hence, the distribution grid 10 may be seen as a district thermal energy distribution grid. The plurality of buildings 5 are thermally coupled to the distribution grid 10. The distribution grid 10 is arranged to circulate and store thermal energy in heat transfer liquid flowing through the distribution grid 10.

The heat transfer liquid of the distribution grid 10 may comprise water. However, other heat transfer liquids may alternatively be used. Some non-limiting examples are ammonia, oils, alcohols and anti-freezing liquids, such as glycol. The heat transfer liquid may also comprise a mixture of two or more of the heat transfer liquids mentioned above. A specific mixture to be used is water mixed with an anti-freezing liquid.

The distribution grid 10 comprises two conduits 12, 14 for allowing flow of heat transfer liquid therethrough. The temperature of the heat transfer liquid of the two conduits 12, 14 is set to be different. A hot conduit 12 in the distribution grid 10 is configured to allow heat transfer liquid of a first temperature to flow therethrough. A cold conduit 14 in the distribution grid 10 is configured to allow heat transfer liquid of a second temperature to flow therethrough. The second temperature is lower than the first temperature.

In case heat transfer liquid is water (possibly with added anti-freezing liquid), a suitable temperature range for the hot heat transfer liquid is between 5 and 45° C. and a suitable temperature range for the cold heat transfer liquid is between 0 and 40° C. A suitable temperature difference between the first and second temperatures is in the range of 5-16° C., preferably in the range of 7-12° C., more preferably 8-10° C.

Preferably, the system is set to operate with a sliding temperature difference which varies depending on the climate. Preferably, the sliding temperature difference is fixed. Hence, the temperature difference may be set to momentarily slide with a fixed temperature difference.

The hot conduit 12 and the cool conduit 14 are separate. The hot conduit 12 and the cool conduit 14 may be arranged in parallel. The hot conduit 12 and the cool conduit 14 are fluidly interconnected at the buildings 5 for allowing of thermal energy transfer to and from the buildings 5. This will be discussed more in detail further below.

The district thermal energy distribution system 1 may comprise a thermal server plant 2. The thermal server plant 2 functions as an external thermal source and/or thermal sink. The function of the thermal server plant 2 is to maintain the temperature difference between the hot and cold conduits 12, 14 of the distribution grid 10. That is, the thermal server plant 2 may be used for balancing the district thermal energy distribution system 1 such that when the distribution grid 10 reaches a temperature end point the thermal server plant 2 is arranged to inhale or exhale thermal energy to/from the distribution grid 10.

A building 5 comprises at least one reversible heat pump assembly 100. One specific building 5 may comprise more than one reversible heat pump assembly 100.

The reversible heat pump assembly 100 is configured to be connected to the distribution grid 10. The reversible heat pump assembly 100 is configured to be connected to a heating circuit 140. The reversible heat pump assembly 100 is configured to be connected to a cooling circuit 150.

The heating circuit 140 may be a local heating circuit configured within a building 5. The heating circuit 140 is configured to allow heat transfer liquid to flow therethrough. The heating circuit 140 may be one or more of a comfort heating system, a process heating system, and hot tap water production system.

The cooling circuit 140 may be a local cooling circuit configured within a building 5. The cooling circuit 150 is configured to allow heat transfer liquid to flow therethrough. The cooling circuit 150 may be one or more of a comfort cooling system, a process cooling system, a refrigeration system, and a freezing system.

The reversible heat pump assembly 100 may be set to operate in either a heating mode or a cooling mode. Hence, a specific reversible heat pump assembly 100 may selectively be set in either the heating mode or the cooling mode.

In the heating mode the reversible heat pump assembly 100 is acting as a thermal sink. Hence, the reversible heat pump assembly 100 is arranged to remove thermal energy from the distribution grid 10. Or in other words, the reversible heat pump assembly 100 is arranged to transfer thermal energy from heat transfer liquid of the distribution grid 10 to heat transfer liquid of the heating circuit 140. This is achieved by transfer of thermal energy from heat transfer liquid taken from the hot conduit 12 to heat transfer liquid of the heating circuit 140, such that heat transfer liquid returned to the cold conduit 14 has a temperature lower than the first temperature and preferably a temperature equal to the second temperature.

Hence, a reversible heat pump assembly 100 may be installed in a building 5 for acting as a provider for heat to one or more local heating circuits 140. As a non-limiting example, a local heating circuit 140 may be arranged to deliver space heating, process heating or hot tap hot water preparation. Alternatively, or in combination, the local heating circuit 140 may deliver pool heating or ice- and snow purging. Hence, the reversible heat pump assembly 100, upon being set in the heating mode, is configured to derive heat from heat transfer liquid of the hot conduit 12 and to create a cooled heat transfer liquid flow into the cold conduit 14. Hence, upon being set in the heating mode, the reversible heat pump assembly 100 fluidly interconnects the hot and cool conduits 12, 14 such that hot heat transfer liquid can flow from the hot conduit 12 through the reversible heat pump assembly 100 and then into the cool conduit 14 after thermal energy in the heat transfer liquid has been consumed by the reversible heat pump assembly 100. Upon being set in the heating mode, the reversible heat pump assembly 100 operates to draw thermal energy from the hot conduit 12 to heat the heating circuit 140 and then deposits the cooled heat transfer liquid into the cool conduit 14.

In the cooling mode the reversible heat pump assembly 100 is acting as a thermal source. Hence, the reversible heat pump assembly 100 is arranged to deposit thermal energy to the distribution grid 10. Or in other words, the reversible heat pump assembly 100 is arranged to transfer thermal energy from heat transfer liquid of the cooling circuit 150 to heat transfer liquid of the distribution grid 10. This is achieved by transfer of thermal energy from heat transfer liquid of the cooling circuit 150 to heat transfer liquid taken from the cold conduit 12, such that heat transfer liquid returned to the hot conduit 12 has a temperature higher than the second temperature and preferably a temperature equal to the first temperature.

Hence, a reversible heat pump assembly 100 may be installed in a building 5 for acting as a provider for cooling to one or more local cooling circuits 150. As a non-limiting example a local cooling circuit 150 may be arranged to deliver space cooling, process cooling or cooling for freezers and refrigerators. Alternatively, or in combination, the local cooler may deliver cooling for ice rinks and ski centers or ice- and snow making. Hence, the reversible heat pump assembly 100, upon being set in the cooling mode, is configured to derive cooling from heat transfer liquid of the cold conduit 14 and to create a heated heat transfer liquid flow into the hot conduit 12. Hence, upon being set in the cooling mode, the reversible heat pump assembly 100 fluidly interconnects the cold and hot conduits 14, 12 such that cold heat transfer liquid can flow from the cold conduit 14 through the reversible heat pump assembly 100 and then into the hot conduit 12 after thermal energy has been deposited into the heat transfer liquid by the reversible heat pump assembly 100. The reversible heat pump assembly 100 operates to extract heat from the cooling circuit 150 and deposits that extracted heat into the hot conduit 12.

A specific reversible heat pump assembly 100 may be connected to one heating circuit 140 and to one cooling circuit 150. This is e.g. illustrated in buildings 5a and 5c of FIG. 1.

A building may comprise a plurality of reversible heat pump assemblies 100 each being connected to one heating circuit 140 and to one cooling circuit 150. This is e.g. illustrated in buildings 5b of FIG. 1.

A plurality of reversible heat pump assemblies 100 may be connected to one heating circuit 140 and to one cooling circuit 150. This is e.g. illustrated in buildings 5d of FIG. 1. If so, one of the plurality of reversible heat pump assemblies 100 may be set in the heating mode for providing heating to the one heating circuit 140 and another one of the plurality of reversible heat pump assemblies 100 may be set in the cooling mode for providing cooling to the one cooling circuit 150. Alternatively, two or more of the plurality of reversible heat pump assemblies 100 may be set in the heating mode for providing heating to the one heating circuit 140. Yet alternatively, two or more of the plurality of reversible heat pump assemblies 100 may be set in the cooling mode for providing cooling to the one cooling circuit 150. Further alternatively, all of the plurality of reversible heat pump assemblies 100 may be set in the heating mode for providing heating to the one heating circuit 140. Alternatively, all of the plurality of reversible heat pump assemblies 100 may be set in the cooling mode for providing cooling to the one cooling circuit 150. At a first specific point in time one of the alternative settings of the plurality of reversible heat pump assemblies 100 indicated above may be used, at another specific point in time another one of the alternative settings of the plurality of reversible heat pump assemblies 100 indicated above may be used. Hence, depending of the heating and cooling needs of the heating circuit 140 and the cooling circuit 150 the plurality of reversible heat pump assemblies 100 may be set differently.

A specific reversible heat pump assembly 100 may be connected to a plurality of heating circuits 140. This is e.g. illustrated in buildings 5e of FIG. 1. If so, the reversible heat pump assembly 100 may be configured to deliver heat to one of the plurality of heating circuits 140 at a first point in time and to another one of the heating circuits 140 at second point in time, the second point in time being different from the first point in time.

A specific reversible heat pump assembly 100 may be connected to a plurality of cooling circuits 150. This is e.g. illustrated in buildings 5f of FIG. 1. If so, the reversible heat pump assembly 100 may be configured to deliver cooling to one of the plurality of cooling circuits 150 at a first point in time and to another one of the cooling circuits 150 at second point in time, the second point in time being different from the first point in time.

Figure 2:
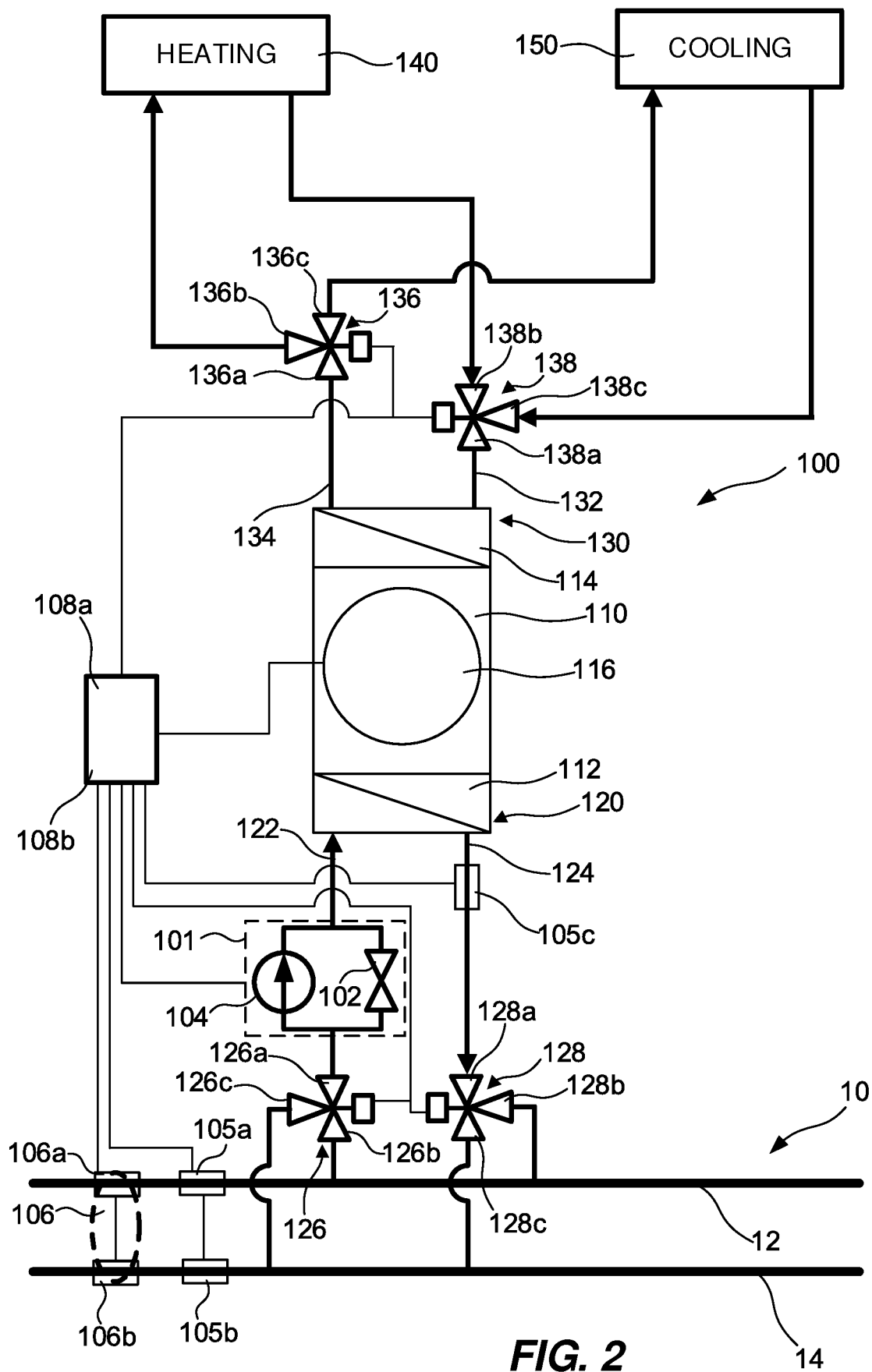
FIG. 2 is a schematic diagram of a reversible heat pump assembly connected to the district thermal energy grid of FIG. 1, to a heating circuit, and to a cooling circuit.

With reference to FIG. 2 the function of a reversible heat pump assembly 100 will now be discussed. The reversible heat pump assembly 100 comprises a heat pump 110 having a first side 120 and a second side 130, a first side inlet valve assembly 126, a second side outlet valve assembly 136.

The first side 120 of the heat pump 110 comprises a first side inlet 122 and a first side outlet 124 allowing heat transfer liquid to flow through the first side 120 of the heat pump 110. Hence, the heat pump 110 is configured such that heat transfer liquid of the district thermal energy distribution system 1 is allowed flow through the first side 120 of the heat pump 110 via the first side inlet 122 and the first side outlet 124.

The second side 130 of the heat pump 110 comprises a second side inlet 132 and a second side outlet 134 allowing heat transfer liquid to flow through the second side 130 of the heat pump 110. Hence, the heat pump 110 is configured such that heat transfer liquid of the heating circuit 140 and/or the cooling circuit 150 is allowed flow through the second side 130 of the heat pump 110 via the second side inlet 132 and the second side outlet 134.

The first side inlet valve assembly 126 comprises a heat pump connection 126a connected to the first side inlet 122, a hot conduit connection 126b arranged to be connected to the hot conduit 12 of a distribution grid 10, and a cold conduit connection 126c arranged to be connected to the cold conduit 14 of the distribution grid 10. All the connections 126a-c of the first side inlet valve assembly 126 are configured to fluidly connect the first side inlet valve assembly 126 to the respective device/conduit. Any such connection may be made using piping. Hence, the heat pump connection 126a is configured to fluidly connect the first side inlet valve assembly 126 with the first side inlet 122 of the heat pump 110. The hot conduit connection 126b is arranged to fluidly connect the first side inlet valve assembly 126 with the hot conduit 12 of a distribution grid 10. The cold conduit connection 126c is arranged to fluidly connect the first side inlet valve assembly 126 with the cold conduit 14 of a distribution grid 10.

The second side outlet valve assembly 136 comprises a heat pump connection 136a connected to the second side outlet 134, a heating circuit connection 136b arranged to be connected to a heating circuit 140, and a cooling circuit connection 136c arranged to be connected to a cooling circuit 150. All the connections 136a-c of the second side outlet valve assembly 136 are configured to fluidly connect the second side outlet valve assembly 136 to the respective device/circuit. Any such connection may be made using piping. Hence, the heat pump connection 136a is configured to fluidly connect the second side outlet valve assembly 136 with the second side outlet 134 of the heat pump 110. The heating circuit connection 136b is arranged to fluidly connect the second side outlet valve assembly 136 with the heating circuit 140. The cooling circuit connection 136c is arranged to fluidly connect the second side outlet valve assembly 136 with the cooling circuit 150.

The reversible heat pump assembly 100 is configured to be selectively set in either a heating mode or a cooling mode. Hence, at a specific point in time the reversible heat pump assembly 100 may be set in one of the heating mode or a cooling mode.

Upon the reversible heat pump assembly 100 is set in the heating mode, the heat pump 110 is configured to transfer heat from the first side 120 to the second side 130. Upon the reversible heat pump assembly 100 is set in the heating mode, the first side inlet valve assembly 126 is configured to fluidly connect the hot conduit connection 126b and the heat pump connection 126a. Upon the reversible heat pump assembly 100 is set in the heating mode, the second side outlet valve assembly 136 is configured to fluidly connect the heat pump connection 136a and the heating circuit connection 136b. Upon the reversible heat pump assembly 100 is set in the heating mode, the first side inlet valve assembly 126 may be configured to fluidly disconnect the cold conduit connection 126c from the heat pump connection 126a. Upon the reversible heat pump assembly 100 is set in the heating mode, the second side outlet valve assembly 136 may be configured to fluidly disconnect the heat pump connection 136a from the cooling circuit connection 136c.

Upon the reversible heat pump assembly 100 is set in the cooling mode, the heat pump 110 is configured to transfer heat from the second side 130 to the first side 120. Upon the reversible heat pump assembly 100 is set in the cooling mode, the first side inlet valve assembly 126 is configured to fluidly connect the cold conduit connection 126c and the heat pump connection 126a. Upon the reversible heat pump assembly 100 is set in the cooling mode, the second side outlet valve assembly 136 is configured to fluidly connect the heat pump connection 136a and the cooling circuit connection 136c. Upon the reversible heat pump assembly 100 is set in the cooling mode, the first side inlet valve assembly 126 may be configured to fluidly disconnect the hot conduit connection 126b from the heat pump connection 126a. Upon the reversible heat pump assembly 100 is set in the cooling mode, the second side outlet valve assembly 136 may be configured to fluidly disconnect the heat pump connection 136a from the heating circuit connection 136b.

Hence, the heat pump 110 is configured to transfer heat from the first side 120 to the second side 130 or vice versa. Such a heat pump 110 may be referred to as a reversible heat pump. The reversible heat pump may comprise a first side coil 112, a second side coil 114 and a reversing valve 116.

Upon the heat pump assembly 100 is set in the heating mode the first side coil 112 is configured to work as an evaporator, the second side coil 114 is configured to work as a condenser, and the reversing valve 116 is set such that refrigerant of the heat pump 110 is flowing from the first side coil 112 to the second side coil 114. Hence, the refrigerant flowing from the first side coil 112 (acting as an evaporator) carries thermal energy from distribution grid 10 to the second side 130 of the heat pump 110. Vapor temperature is augmented within the heat pump 110 by compressing it. The second side coil 114 (acting as a condenser) then transfers thermal energy (including energy from the compression) to the second side outlet 134 of the heat pump 110. The transferred heat will heat heat transfer liquid of the heating circuit 140. The refrigerant is then allowed to expand, and hence cool, and absorb heat from the distribution grid 10 in the first side coil 112 (acting as an evaporator), and the cycle repeats.

Upon the heat pump assembly 100 is set in the cooling mode the second side coil 114 is configured to work as an evaporator, the first side coil 112 is configured to work as a condenser, and the reversing valve 116 is set such that refrigerant of the heat pump 110 is flowing from the second side coil 114 to the first side coil 112. Hence, upon the heat pump assembly 100 is set in the cooling mode the cycle is similar to what was discussed above in connection with the heat pump assembly 100 is set in the heating mode, but the first side coil 112 is now the condenser and the second side coil 114 (which reaches a lower temperature) is the evaporator.

The heat pump assembly 100 may further comprise a first side outlet valve assembly 128. The first side outlet valve assembly 128 comprises a heat pump connection 128a connected to the first side outlet 124, a hot conduit connection 128b arranged to be connected to a hot conduit 12 of a distribution grid 10, and a cold conduit connection 128c arranged to be connected to a cold conduit 14 of the distribution grid 10. All the connections 128a-c of the first side outlet valve assembly 128 are configured to fluidly connect the first side outlet valve assembly 128 to the respective device/conduit. Any such connection may be made using piping. Hence, the heat pump connection 128a is configured to fluidly connect the first side outlet valve assembly 128 with the first side outlet 124 of the heat pump 110. The hot conduit connection 128b is arranged to fluidly connect the first side outlet valve assembly 128 with the hot conduit 12 of a distribution grid 10. The cold conduit connection 128c is arranged to fluidly connect the first side outlet valve assembly 128 with the cold conduit 14 of a distribution grid 10. Upon the reversible heat pump assembly 100 is set in the heating mode, the first side outlet valve assembly 128 is configured to fluidly connect the heat pump connection 128a and the cold conduit connection 126c. Upon the reversible heat pump assembly 100 is set in the heating mode, the first side outlet valve assembly 128 may be configured to fluidly disconnect the heat pump connection 128a from the hot conduit connection 128b. Upon the reversible heat pump assembly 100 is set in the cooling mode, the first side outlet valve assembly 128 is configured to fluidly connect the heat pump connection 128a and the hot conduit connection 128b. Upon the reversible heat pump assembly 100 is set in the cooling mode, the first side outlet valve assembly 128 may be configured to fluidly disconnect the heat pump connection 128a from cold conduit connection 128c.

The heat pump assembly 100 may further comprise a second side inlet valve assembly 138. The second side inlet valve assembly 138 comprises a heat pump connection 138a connected to the second side inlet 132, a heating circuit connection 138b arranged to be connected to the heating circuit 140 and a cooling circuit connection 138c arranged to be connected to the cooling circuit 150. All the connections 138a-c of the second side inlet valve assembly 138 are configured to fluidly connect the second side inlet valve assembly 138 to the respective device/circuit. Any such connection may be made using piping. Hence, the heat pump connection 138a is configured to fluidly connect the second side inlet valve assembly 138 with the second side inlet 132 of the heat pump 110. The heating circuit connection 138b is arranged to fluidly connect the second side inlet valve assembly 138 with the heating circuit 140. The cooling circuit connection 138c is arranged to fluidly connect the second side inlet valve assembly 138 and the cooling circuit 150. Upon the reversible heat pump assembly 100 is set in the heating mode, the second side inlet valve assembly 138 is configured to fluidly connect the heat pump connection 138a with the heating circuit connection 138b. Upon the reversible heat pump assembly 100 is set in the heating mode, the second side inlet valve assembly 138 may be configured to fluidly disconnect the heat pump connection 138a from the cooling circuit connection 136c. Upon the reversible heat pump assembly 100 is set in the cooling mode, the second side inlet valve assembly 138 is configured to fluidly connect the heat pump connection 138a and the cooling circuit connection 138c. Upon the reversible heat pump assembly 100 is set in the cooling mode, the second side inlet valve assembly 138 may be configured to fluidly disconnect the heat pump connection 138a from the heating circuit connection 138b.

The heat pump assembly 100 may further comprise a heat pump assembly mode controller 108a. The heat pump assembly mode controller 108a is configured to set the heat pump assembly 100 in the heating mode or in the cooling mode. This may e.g. be made by the heat pump assembly mode controller 108a being configured to control the heat pump 110, the first side inlet valve assembly 126 and/or the second side outlet valve assembly 136. The heat pump assembly mode controller 108a may further be configured to control the first side outlet valve assembly 128. The heat pump assembly mode controller 108a may further be configured to control the second side inlet valve assembly 138. The heat pump assembly mode controller 108a is typically software implemented. However, the heat pump assembly mode controller 108a may be a combined hardware and software implementation. The software portions of the heat pump assembly mode controller 108a may be run on a processing unit. The heat pump assembly mode controller 108a is configured to send control signal to the assembly portions of the heat pump assembly 100 to be controlled by the heat pump assembly mode controller 108a.

The heat pump assembly mode controller 108a may be configured to set the heat pump assembly 100 in the heating mode or in the cooling mode based on one or more demand signals indicative of what heating and/or cooling demands are needed in the building 5 wherein the heat pump assembly 100 is installed. Hence, heat pump assembly mode controller 108a is configured to receive one or more demand signals from heating and cooling systems of the building 5 wherein the heat pump assembly 100 is installed. Each heating system of the building 5 comprises one or more heating circuits 140 connected to the heat pump assembly 100. Each cooling system of the building 5 comprises one or more cooling circuits 150 connected to the heat pump assembly 100. Examples of heating systems are a hot water production system (e.g. a domestic hot water production system), a comfort heating system, and a process heating system. Examples of cooling systems are a comfort cooling system and a process cooling system. The heat pump assembly mode controller 108a may be configured to prioritize the demands from the different heating and cooling systems differently. For example, the heat pump assembly mode controller 108a may be configured to prioritize a hot water production system higher than a comfort heating system or a cooling system. The heat pump assembly mode controller 108a may be configured to set which one of a plurality of heating circuits 140 to be provided with heating from the heat pump assembly 100. The heat pump assembly mode controller 108a may be configured to set which one of a plurality of cooling circuits 150 to be provided with cooling from the heat pump assembly 100.

The heat pump assembly 100 may further comprise a pressure difference determining device 106. The pressure difference determining device 106 is configured to determine a local pressure difference, $\Delta p$, between heat transfer liquid of the hot and the cold conduits 12; 14 of the thermal energy circuit 10. $\Delta p$ is preferably measured in the vicinity to where the heat pump assembly 100 is connected to the thermal energy circuit 10. The pressure difference determining device 106 may comprises a hot conduit pressure determining device 106a and a cold conduit pressure determining device 106b. The hot conduit pressure determining device 106a is arranged to be connected to the hot conduit 12 for measuring a local pressure, p1$h$, of heat transfer liquid of the hot conduit 12. The cold conduit pressure determining device 106b is arranged to be connected to the cold conduit 14 for measuring a local pressure, p1$c$, of heat transfer liquid of the cold conduit 14. The pressure difference determining device 106 is configured to determine $\Delta p$ as a pressure difference between the local pressure of heat transfer liquid of the hot conduit 12 and the local pressure of heat transfer liquid of the cold conduit 14.

The pressure difference determining device 106 may be implemented as a hardware device, a software device, or as a combination thereof. The consumer assembly pressure difference determining device 106 is arranged to generate a local pressure difference signal indicative of the consumer assembly local pressure difference, $\Delta p$. The pressure difference determining device 106 may be configured to send the local pressure difference signal to a flow mode controller 108b. The flow mode controller 108b is typically software implemented. However, the flow mode controller 108b may be a combined hardware and software implementation. The software portions of the flow mode controller 108b may be run on a processing unit. The flow mode controller 108b and the heat pump assembly mode controller 108a may be implemented as a single device.

The heat pump assembly 100 may further comprise a flow controller 101. The flow controller 101 is configured to control the flow of heat transfer fluid from the distribution grid 10 to the heat pump 110. Hence, the flow controller 101 is connected in between the distribution grid 10 and the heat pump 110. The flow controller 101 may be connected in between the first side inlet valve assembly 126 and the first side inlet 122. This is preferred since only one flow controller 101 is needed. Hence, the heat pump 110 is connected to the distribution grid 10 via the flow controller 101. The flow controller 101 is selectively set in a pumping mode or in a flowing mode. The flow controller 101 is selectively set in the pumping mode or in the flowing mode based on a heat pump assembly local delivery differential pressure, $\Delta p_{dp}$, according to the following:

$\Delta p_{dp} = \Delta p + \Delta p_{che}$ wherein $\Delta p_{che}$ is a differential pressure for overcoming the pressure drop over the heat pump 110 and possible also the first side inlet valve assembly 126 and/or the first side outlet valve assembly 128. This will be discussed in more detail below. The flow mode controller 108b may be configured to set the flow controller 101 in the pumping mode or in a flowing mode. Embodiments of a flow controller 101 may e.g. be found in PCT/EP2017/083077 by the same applicant.

Upon set in the pumping mode the flow controller 101 is configured to act as a pump 104 for pumping heat transfer liquid from the distribution grid 10 into the heat pump 110. Hence, upon the flow controller 101 being set in the pumping mode, heat transfer liquid from the distribution grid 10 is pumped into the heat pump 110. Upon set in flowing mode the flow controller 101 is configured to act as a flow regulator 102 for allowing heat transfer liquid from the distribution grid 10 to flow into the heat pump 110. The flow regulator 102 may be seen as a valve. Hence, upon the flow controller 101 being set in the flowing mode, heat transfer liquid from the distribution grid 10 is allowed to flow into the heat pump 110. Again, the choice of allowing heat transfer liquid from the distribution grid 10 to flow into the heat pump 110 or pumping heat transfer liquid from the distribution grid 10 into the heat pump 110, is made based on the heat pump assembly local delivery differential pressure, $\Delta p_{dp}$.

The flow mode controller 108b is configured to selectively set the flow controller 101 in the pumping mode or in the flowing mode. In the pumping mode the flow controller 101 is acting as a pump 104. In the flowing mode the flow controller 101 is acting as a flow regulator 102. Hence, the flow controller 101 is configured to selectively act as a pump 104 or as a flow regulator 102. The flow controller 101 is configured to, upon acting as a pump 104, pump heat transfer liquid through the flow controller 101. The flow controller 101 is configured to, upon acting as a flow regulator 102, allow heat transfer liquid to flow through the flow controller 101.

In the thermal energy circuit 10 a differential pressure between heat transfer liquid in hot and cold conduits 12, 14 may change over time. More precisely, the differential pressure between heat transfer liquid of the hot and cold conduits 12, 14 may change such that the differential pressure changes from positive to negative or vice versa. Depending on the variating differential pressure between the hot and cold conduits 12, 14 of the thermal energy circuit 10 and depending on if the reversible heat pump assembly 100 is set in the heating mode or in the cooling mode sometimes heat transfer liquid of the thermal energy circuit 10 need to be pumped through the reversible heat pump assembly 100 and sometimes heat transfer liquid of the thermal energy circuit 10 need to be allowed to flow through the reversible heat pump assembly 100. Some examples are given directly below.

Assume that the reversible heat pump assembly 100 is set in the heating mode. Hence, heat transfer liquid of the thermal energy circuit 10 is set to be transferred from the hot conduit 12 via the first side 120 of the heat pump 110 to the cold conduit 14. In case the heat pump assembly local delivery differential pressure, $\Delta p_{dp}$, is indicative of that there is a higher local pressure in the hot conduit 12 than in the cold conduit 14 the flow controller 101 shall be set to allow a flow of heat transfer liquid to flow through the flow controller 101. Hence, the flow mode controller 108b is configured to set the flow controller 101 in the flowing mode. In case the heat pump assembly local delivery differential pressure, $\Delta p_{dp}$, is indicative of that there is a lower local pressure in the hot conduit 12 than in the cold conduit 14 the flow controller 101 shall be set to pump a flow of heat transfer liquid from the hot conduit 12 to the cold conduit 14.

Hence, the flow mode controller 108b is configured to set the flow controller 101 in the pumping mode.

Assume that the reversible heat pump assembly 100 is set in the cooling mode. Hence, heat transfer liquid of the thermal energy circuit 10 is set to be transferred from the cold conduit 14 via the first side 120 of the heat pump 110 to the hot conduit 16. In case the heat pump assembly local delivery differential pressure, $\Delta p_{dp}$, is indicative of that there is a higher local pressure in the cold conduit 14 than in the hot conduit 12 the flow controller 101 shall be configured to allow a flow of heat transfer liquid to flow through the flow controller 101. Hence, the flow mode controller 108b is configured to set the flow controller 101 in the flowing mode. In case the heat pump assembly local delivery differential pressure, $\Delta p_{dp}$, is indicative of that there is a lower local pressure in the cold conduit 14 than in the hot conduit 12 the flow controller 101 shall be configured to pump a flow of heat transfer liquid from the cold conduit 14 to the hot conduit 12. Hence, the flow mode controller 108b is configured to set the flow controller 101 in the pumping mode.

The flow mode controller 108b may also be configured to control the flow rate of heat transfer liquid through the flow controller 101. Accordingly, the flow mode controller 108b may also be configured to control the pump 104 of the flow controller 101 such that the flow rate of heat transfer liquid pumped by the pump 104 is controlled. Moreover, the flow mode controller 108b may also be configured to control the flow regulator 102 such that the flow rate of heat transfer liquid flowing through the flow controller 101 is controlled.

The reversible heat pump assembly 100 may further comprise a hot conduit temperature determining device 105a and a cold conduit temperature determining device 105b. The hot conduit temperature determining device 105a is arranged to be connected to the hot conduit 12 for measuring a local temperature, $t_h$, of heat transfer liquid of the hot conduit 12. The cold conduit temperature determining device 105b is arranged to be connected to the cold conduit 14 for measuring a local temperature, $t_c$, of the heat transfer liquid of the cold conduit 14. The hot conduit temperature determining device 105a and the cold conduit temperature determining device 105b may connected to the flow mode controller 108b for communicating $t_h$ and $t_c$ thereto.

The reversible heat pump assembly 100 may further comprise an outlet temperature determining device 105c. The outlet temperature determining device 105c is arranged to be connected to a return conduit connecting the first side outlet 124 of the heat pump 110 and the first side outlet valve assembly 128. The outlet temperature determining device 105c is arranged to measure an outlet temperature, $t_{return}$, of heat transfer liquid exiting the first side outlet 124 of the heat pump 110 and being returned to the thermal energy circuit 10. The outlet temperature determining device 105c may be connected to the flow mode controller 108b for communicating $t_{return}$ thereto.

The different temperatures $t_h$, $t_c$ and $t_{return}$ may be used for controlling the flow rate of heat transfer liquid of the thermal energy circuit 10 through heat pump 110. Upon the reversible heat pump assembly 100 is set in the heating mode the flow rate is preferably controlled such that the $t_{return}=t_c$. Upon the reversible heat pump assembly 100 is set in the cooling mode the flow rate is preferably controlled such that the $t_{return}=t_h$. Alternatively, or in combination, and independent upon if the reversible heat pump assembly 100 is set in the heating mode or in the cooling mode, the flow rate of heat transfer liquid of the thermal energy circuit 10 through heat pump 110 may be controlled such that the heat pump 110 inhale or exhale heat at a defined temperature difference.

A temperature difference of 8-10° C. corresponds to optimal flows through the heat pump 110. The flow rate of heat transfer liquid of the thermal energy circuit 10 through heat pump 110 may be controlled by the flow mode controller 108b by controlling the flow rate through the flow controller 101.

Hence, a reversible heat pump assembly 100 is disclosed. The heat pump assembly 100 comprises a heat pump 110 having a first side 120 and a second side 130. The heat pump 110 is configured to transfer heat from the first side 120 to the second side 130 or vice versa. The heat pump assembly 100 further comprises a first side inlet valve assembly 126 having a heat pump connection 126a connected to the first side 120, and hot and cold conduit connections 126b; 126c arranged to be connected to the distribution grid 10 comprising hot and cold conduits 12; 14. The heat pump assembly 100 further comprise a second side outlet valve assembly 136 having a heat pump connection 136a connected to the second side 130, and heating and cooling circuit connections 136b; 136c arranged to be connected to heating and cooling circuits 130; 140, respectively. The reversible heat pump assembly 100 is configured to be selectively set in either a heating mode or a cooling mode. In the heating mode the heat pump 110 is configured to transfer heat from the first side 120 to the second side 130. In the heating mode the first side inlet valve assembly 126 is configured to fluidly connect the hot conduit connection 126b and the heat pump connection 126a. In the heating mode the second side outlet valve assembly 136 is configured to fluidly connect the heat pump connection 136a and the heating circuit connection 136b. In the cooling mode the heat pump 110 is configured to transfer heat from the second side 130 to the first side 120. In the cooling mode the first side inlet valve assembly 126 is configured to fluidly connect the cold conduit connection 126c and the heat pump connection 126a. In the cooling mode the second side outlet valve assembly 136 is configured to fluidly connect the heat pump connection 136a and the cooling circuit connection 136c.

Moreover, a district thermal energy distribution system 1, comprising the hot and the cold conduits 12, 14 is provided. The district thermal energy distribution system 1 also comprises one or more reversible heat pump assemblies 100. Accordingly, the district thermal energy distribution system 1 comprises a thermal energy circuit 10 comprising the hot and cold conduit 12, 14 for allowing flow of heat transfer liquid therethrough. The district thermal energy distribution system 1 further comprises one or more reversible heat pump assemblies 100. In accordance with what has been disclosed above the one or more reversible heat pump assemblies 100 may be connected to the thermal energy circuit 10 via a flow controller 101. The flow controller 101 is selectively set in pumping mode or a flowing mode based on the local pressure difference between heat transfer liquid of the hot and cold conduits 12, 14. Alternatively or in addition, the district thermal energy distribution system 1 may comprise one or more reversible heat pump assemblies 100 selectively connected to the thermal energy circuit 10 via a valve (e.g. a flow regulator) and a pump. Hence, instead of using a flow controller 101 according to the above a reversible heat pump assembly 100 may be connected to the thermal energy circuit 10 via a valve and via a pump. Depending on the mode of the reversible heat pump assembly 100 and on the local pressure difference between the hot and cold conduits 12; 14 of the thermal energy circuit 10 at the connection between the reversible heat pump assembly 100 and thermal energy circuit 10 either the valve or the pump is used for letting heat transfer liquid of the thermal energy circuit 10 to flow through the first side 120 of the heat pump 110 of the reversible heat pump assembly 100.

Preferably, the demand to inhale or exhale heat using the reversible heat pump assembly 100 is made at a defined temperature difference. A temperature difference of 8-10° C. corresponds to optimal flows through the heat pump 110.

The local pressure difference between the hot and cold conduits 12, 14 may vary along the thermal energy circuit 10. Especially, the local pressure difference between the hot and cold conduits 12, 14 may vary from positive to negative pressure difference seen from one of the hot and cold conduits 12, 14. Hence, sometimes a specific reversible heat pump assembly 100 may need to pump heat transfer liquid of the thermal energy circuit 10 through the corresponding heat pump 110 and sometimes the reversible heat pump assembly 100 may need to let heat transfer liquid of the thermal energy circuit 10 to flow through the corresponding heat pump 110. Accordingly, it will be possible to let all the pumping within the district thermal energy distribution system 1 to take place in the reversible heat pump assemblies 100. Hence, an easy to build district thermal energy distribution system 1 is provided. Further a district thermal energy distribution system 1 that is easy to control is provided. Moreover, due to the limited flows and pressures needed the pump assemblies of the flow controllers 101 may be based on frequency controlled circulation pumps.

With reference to FIG. 1, the district thermal energy distribution system 1 further comprises a control server 200. The control server 200 may be any type of server comprising a processing unit. The control server 200 may physically comprise one single server device. Alternatively, the control server 200 may be distributed over several server devices. The control server 200 may be comprised in thermal server plant 2, or at any other suitable location. The control server 200 may be configured to communicate with the thermal server plant 2. The control server 200 is further configured to communicate with the heat pump assembly mode controllers 108a of the reversible heat pump assemblies 100 of the district thermal energy distribution system 1. The control server 200 may communicate with the thermal server plant 2 and/or the heat pump assembly mode controllers 108a via a dedicated network, over the Internet, or a combination thereof. The communication in the dedicated network or the Internet may be wireless and/or wired. The control server 200 may be a central control server, "central" in the sense that it may handle data for a plurality of heat pump assembly mode controllers 108a. The control server 200 is configured to send a control message to one or more of the heat pump assembly mode controllers 108a.

Figure 3:
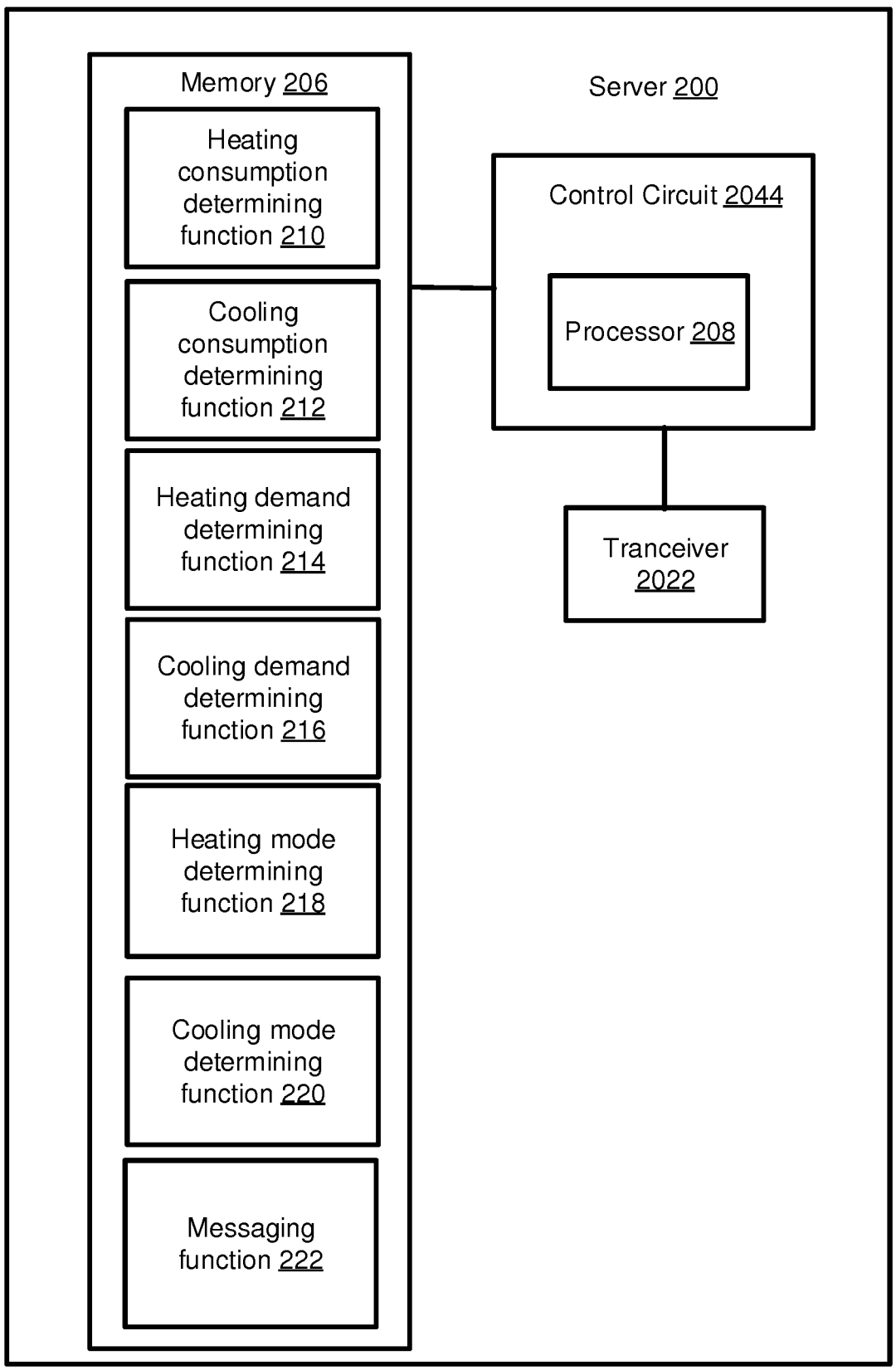
FIG. 3 is a block scheme of a method for controlling the district thermal energy distribution system of FIG. 1.

A more detailed schematic of the control server 200 is schematically shown in connection with FIG. 3. The control server 200 comprises a transceiver 202, a control circuit 204 and a memory 206.

The transceiver 202 may be configured to communicate with the thermal server plant 2. The transceiver 202 is further configured to communicate with the heat pump assembly mode controllers 108a of the reversible heat pump assemblies 100 of the district thermal energy distribution system 1. The transceiver 202 is configured to communicate individually with the heat pump assembly mode controllers 108a. Hence, the transceiver 202 enables the control server 200 to establish communications with other device, such as the heat pump assembly mode controllers 108a and the thermal server plant 2. That said, each of the heat pump assembly mode controllers 108a, and the thermal server plant 2 also comprises a respective transceiver for communicating with the control server 200. The communications may include data transfers, and the like. Data transfers may include, but are not limited to, downloading and/or uploading data and receiving or sending messages. The data may be processed by the control server 200, the thermal server plant 2 and/or each of the heat pump assembly mode controllers 108a. The processing may include storing the data in a memory, e.g. the memory 206 of the control server 200, executing operations or function, and so forth.

The control circuit 204 is configured to carry out overall control of functions and operations of the control server 200. The control circuit 204 may include a processor 208, such as a central processing unit (CPU), microcontroller, or microprocessor. The processor 208 is configured to execute program code stored in the memory 206, in order to carry out functions and operations of the control server 200.

The memory 206 may be one or more of a buffer, a flash memory, a hard drive, a removable media, a volatile memory, a non-volatile memory, a random access memory (RAM), or another suitable device. In a typical arrangement, the memory 206 may include a non-volatile memory for long term data storage and a volatile memory that functions as system memory for the control circuit 204. The memory 206 may exchange data with the control circuit 204 over a data bus. Accompanying control lines and an address bus between the memory 206 and the control circuit 204 also may be present.

Functions and operations of the control server 200 may be embodied in the form of executable logic routines (e.g., lines of code, software programs, etc.) that are stored on a non-transitory computer readable medium (e.g., the memory 206) of the control server 200 and are executed by the control circuit 204 (e.g., using the processor 208). Furthermore, the functions and operations of the control server 200 may be a stand-alone software application or form a part of a software application that carries out additional tasks related to the control server 200. The described functions and operations may be considered a method that the corresponding device is configured to carry out. Such a method will also be further discussed below in connection with FIG. 4. Also, while the described functions and operations may be implemented in software, such functionality may as well be carried out via dedicated hardware or firmware, or some combination of hardware, firmware and/or software.

The control circuit 204 may execute a heating consumption determining function 210. The heating consumption determining function 210 is configured to register over time, heating delivered by one or more of the reversible heat pump assemblies 100. The registering may be made by storing time resolved data relating to heating delivered by the one or more of the reversible heat pump assemblies 100 in the memory 206. The heating consumption determining function 210 may be configured to determine an amount of heating for one or more of the reversible heat pump assemblies 100 delivered over a past time period. More specifically, the heating consumption determining function 210 may be configured to determine an amount of heating for each of the reversible heat pump assemblies 100 delivered over the past time period. The past time period may be one hour. The past time period may be one day. The past time period may something between one hour and one day.

The control circuit 204 may execute a cooling consumption determining function 212. The cooling consumption determining function 212 is configured to registering, over time, cooling delivered by one or more of the reversible heat pump assemblies 100. The registering may be made by storing data relating to cooling delivered by the one or more of the reversible heat pump assemblies 100 in the memory 206. The cooling consumption determining function 212 may be configured to determine an amount of cooling for one or more of the reversible heat pump assemblies 100 delivered over the past time period. More specifically, the cooling consumption determining function 212 may be configured to determine an amount of cooling for each of the reversible heat pump assemblies 100 delivered over the past time period.

The control circuit 204 may execute a heating demand determining function 214. The heating demand determining function 214 is configured to, for a time period, determine a heating demand from local heating circuit(s) 140 of the reversible heat pump assemblies 100. The time period may be an already passed time period, such as the past time period. The time period may be a time period to-be, such as the future time period.

The control circuit 204 may execute a cooling demand determining function 216. The cooling demand determining function 216 is configured to, for a time period, determine a cooling demand from local cooling circuit(s) 150 of the reversible heat pump assemblies 100. The time period may be an already passed time period, such as the past time period. The time period may be a time period to-be, such as the future time period.

The control circuit 204 may execute a heating mode determining function 218. The heating mode determining function 218 is configured to determine a first set of the reversible heat pump assemblies 100 of the district thermal energy distribution system 1 to be set in the heating mode for a future time period. The first set of the reversible heat pump assemblies 100 is preferably a subset of the reversible heat pump assemblies 100 of the district thermal energy distribution system 1. The future time period is a time period to occur in the future. The future time period may be a time period of at least 10 minutes. The future time period may be an hour. The future time period may be one day. The heating mode determining function 218 may be configured to base the determining of the first set of reversible heat pump assemblies 100 on data registered by the heating consumption determining function 210. Hence, the determining of the first set of reversible heat pump assemblies 100 may be based on the determined amount of heating delivered by the reversible heat pump assemblies 100 over the past time period. Alternatively, or in combination, the heating mode determining function 218 may be configured to base the determining of the first set of reversible heat pump assemblies 100 on heating demands determined by the heating demand determining function 214.

The control circuit 204 may execute a cooling mode determining function 220. The cooling mode determining function 220 is configured to determine a second set of the reversible heat pump assemblies 100 of the district thermal energy distribution system 1 to be set in the cooling mode for the future time period. The second set of the reversible heat pump assemblies 100 is preferably a subset of the reversible heat pump assemblies 100 of the district thermal energy distribution system 1. Further the second set of the plurality of reversible heat pump assemblies 100 is separate from the first set of the plurality of reversible heat pump assemblies 100. The cooling mode determining function 220 may be configured to base the determining of the second set of reversible heat pump assemblies 100 on data registered by the cooling consumption determining function 212. Hence, the determining of the second set of reversible heat pump assemblies 100 may be based on the determined amount of cooling delivered by the reversible heat pump assemblies 100 over the past time period. Alternatively, or in combination, the cooling mode determining function 2208 may be configured to base the determining of the second set of reversible heat pump assemblies 100 on cooling demands determined by the cooling demand determining function 216.

The control circuit 204 may execute a messaging function 222. The messaging function 222 is configured to generate control messages for the heat pump assembly mode controllers 108a of the reversible heat pump assemblies 100 of the first and second sets. The messaging function 222 is further configured to send a heating mode control message to the heat pump assembly mode controllers 108a of the first set of reversible heat pump assemblies 100. The heating mode control message comprises information to set the reversible heat pump assembly 100 in the heating mode for the future time period. The messaging function 222 may be configured to generate a specific heating mode control message for each of the reversible heat pump assemblies 100 of the first set. The messaging function 222 may be configured to generate a general heating mode control message for the reversible heat pump assemblies 100 of the first set.

The messaging function 222 is further configured to send a cooling mode control message to the heat pump assembly mode controllers 108a of the second set of reversible heat pump assemblies 100. The cooling mode control message comprises information to set the reversible heat pump assembly 100 in the heating mode for the future time period. The messaging function 222 may be configured to generate a specific cooling mode control message for each of the reversible heat pump assemblies 100 of the second set. The messaging function 222 may be configured to generate a general cooling mode control message for the reversible heat pump assemblies 100 of the second set.

Upon receipt of a control message, a heat pump assembly mode controller 108a is configured to set the respective reversible heat pump assembly 100 in either the heating mode or the cooling mode for the future time period. The setting of the reversible heat pump assembly 100 in either the heating mode or the cooling mode for the future time period may be based upon if the heat pump assembly mode controller 108a receives a heating mode control message or a cooling mode control message.

It shall be noted that upon set in the heating mode, for the future time period, the respective reversible heat pump assembly 100 is prohibited to be set in the cooling mode. Hence, during the future time period, the respective reversible heat pump assembly 100 may be set to deliver heating or set to be inactive.

It shall be noted that upon set in the cooling mode, for the future time period, the respective reversible heat pump assembly 100 is prohibited to be set in the heating mode. Hence, during the future time period, the respective reversible heat pump assembly 100 may be set to deliver cooling or set to be inactive.

Figure 4:
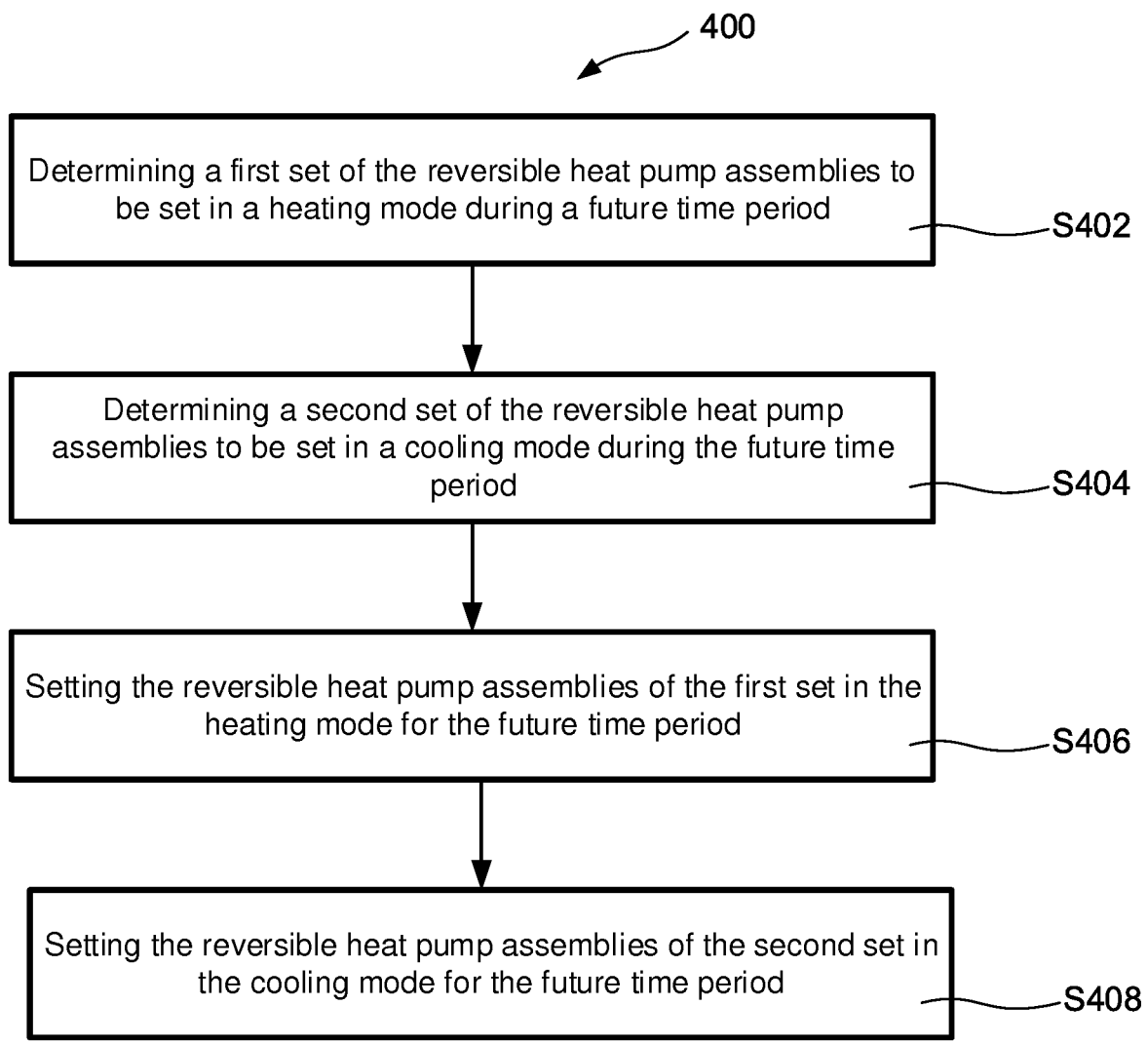
FIG. 4 is a flowchart of a method for controlling the district thermal energy distribution system of FIG. 1.

In connection with FIG. 4 a method 400 for controlling the district thermal energy distribution system 1 will be discussed. Specifically, the method 400 may be said to be for controlling setting of reversible heat pump assemblies 100 of a district thermal energy distribution system 1 in either the heating mode or the cooling mode. As illustrated in connection with FIG. 1, a specific building 5 may comprise one or more reversible heat pump assemblies 100. Typically, the controlled reversible heat pump assemblies 100 are distributed in different buildings 5. The method 400 comprises the following acts. Determining S402 a first set of the reversible heat pump assemblies to be set in a heating mode during a future time period. The act of determining S402 the first set of the reversible heat pump assemblies 100 may be made at the control server 200. Determining S404 a second set of the reversible heat pump assemblies to be set in a cooling mode during the future time period. The second set of reversible heat pump assemblies 100 is separate from the first set of reversible heat pump assemblies 100. The act of determining S404 the second set of the reversible heat pump assemblies 100 may be made at the control server 200. Setting S406 the reversible heat pump assemblies of the first set in the heating mode for the future time period. Setting S408 the reversible heat pump assemblies of the second set in the cooling mode for the future time period. Upon set in the heating mode for the future time period, the respective reversible heat pump assembly 100 is prohibited to be set in the cooling mode. Upon set in the cooling mode for the future time period, the respective reversible heat pump assembly 100 is prohibited to be set in the heating mode.

The method 400 may further comprise sending, from the control server 200 to the reversible heat pump assemblies 100 of the first set of the reversible heat pump assemblies 100, a respective control message to set the respective reversible heat pump assembly 100 in the heating mode for the future time period.

The method 400 may further comprise sending, from the control server (200) to the reversible heat pump assemblies 100 of the second set of the reversible heat pump assemblies 100, a respective control message to set the respective reversible heat pump assembly 100 in the cooling mode for the future time period.

The method 400 may further comprise determining an amount of heating and an amount of cooling for the reversible heat pump assemblies 100 delivered over a past time period. One or both of the acts of determining S402 the first set of the reversible heat pump assemblies 100 and determining S404 the second set of the reversible heat pump assemblies 100 may be based on the determined amount of heating and the determined amount of cooling delivered by the reversible heat pump assemblies 100 over the past time period.

The method 400 may further comprise, for a time period, determining a heating demand from the one or more local heating circuits 140 of the reversible heat pump assemblies 100, and determining a cooling demand from the one or more local cooling circuits 150 of the reversible heat pump assemblies 100. One or both of the acts of determining S402 the first set of the reversible heat pump assemblies 100 and determining S404 the second set of the reversible heat pump assemblies 100 are based on the determined heating and cooling demands. The time period may be an already passed time period. The time period may be a time period to-be.

The person skilled in the art realizes that the present invention by no means is limited to the preferred embodiments described above. On the contrary, many modifications and variations are possible within the scope of the appended claims.

For example, in the above discussed embodiments the flow mode controller 108b and the heat pump assembly mode controller 108a are discussed as being implemented as a single device. However, the functions of the two different mode controllers 108a, 108b may be distributed on different physical devices. For example, one device (acting as the heat pump assembly mode controller 108a) may be configured to control the setting of the reversible heat pump assembly 100 in either the heating mode or the cooling mode, another device (acting as the flow mode controller 108b) may be configured to control if the flow controller 101 shall be set in the flowing mode or in the pumping mode. These two different devices may be configured to communicate with each other.

In FIG. 2 two three-way valves 136, 138 are disclosed. In order to achieve the functionality of a reversible heat pump assembly 100 only one of them may be needed.

Additionally, variations to the disclosed embodiments can be understood and effected by the skilled person in practicing the claimed invention, from a study of the drawings, the disclosure, and the appended claims.

The invention claimed is:

1. A method for controlling a district thermal energy distribution system, the district thermal energy distribution system comprising:
 a distribution grid for a liquid based distribution of heating and cooling, the distribution grid comprising a hot conduit configured to allow heat transfer liquid of a first temperature to flow therethrough and a cold conduit configured to allow heat transfer liquid of a second temperature to flow therethrough, the second temperature is lower than the first temperature, wherein the distribution grid is configured to interconnect a plurality of buildings within a city that implements the district thermal energy distribution system enabling the liquid based distribution of the heating and cooling throughout the plurality of buildings;
 a control server; and
 a plurality of reversible heat pump assemblies connected to the distribution grid, wherein the plurality of reversible heat pump assemblies are distributed throughout the plurality of buildings, and wherein each reversible heat pump assembly comprises:
  a heat pump having a first side and a second side, the heat pump being configured to transfer heat from the first side to the second side or vice versa, the heat pump being configured to allow heat transfer liquid from the distribution grid to flow through the first side, and to allow heat transfer liquid of either one or more local heating circuits or one or more local cooling circuits to flow through the second side,
  wherein the reversible heat pump assembly is configured to be selectively set in either a heating mode or a cooling mode,
  wherein in the heating mode:
   heat transfer liquid is allowed to flow from the hot conduit of the distribution grid through the first side and to the cold conduit of the distribution grid, and
   the heat pump is configured to transfer heat from the first side to the second side,
  wherein in the cooling mode:
   heat transfer liquid is allowed to flow from the cold conduit of the distribution grid through the first side and to the hot conduit of the distribution grid, and
   the heat pump is configured to transfer heat from the second side to the first side, and
 a heat pump assembly mode controller configured to set the reversible heat pump assembly in either the heating mode or the cooling mode;
 wherein the method comprises:
  determining, at the control server, a first set of the plurality of reversible heat pump assemblies to be set in the heating mode during a future time period;
  determining, at the control server, a second set of the plurality of reversible heat pump assemblies to be set in the cooling mode during the future time period, wherein the second set of the plurality of reversible heat pump assemblies is separate from the first set of the plurality of reversible heat pump assemblies;

sending, from the control server to the heat pump assembly mode controllers of the reversible heat pump assemblies of the first set of the plurality of reversible heat pump assemblies, a respective control message to set the respective reversible heat pump assembly in the heating mode for the future time period;

sending, from the control server to the heat pump assembly mode controllers of the reversible heat pump assemblies of the second set of the plurality of reversible heat pump assemblies, a respective control message to set the respective reversible heat pump assembly in the cooling mode for the future time period; and setting, by the respective heat pump assembly mode controller and in response to receiving the respective control message, the respective reversible heat pump assembly in either the heating mode or the cooling mode for the future time period.

2. The method according to claim 1, further comprising:
determining an amount of heating and an amount of cooling for the reversible heat pump assemblies delivered over a past time period; and
where the acts of determining the first set of the plurality of reversible heat pump assemblies and determining the second set of the plurality of reversible heat pump assemblies are based on the determined amount of heating and the determined amount of cooling delivered by the reversible heat pump assemblies over the past time period.

3. The method according to claim 1, further comprising:
for a time period, determining a heating demand from the one or more local heating circuits of the plurality of reversible heat pump assemblies, and determining a cooling demand from the one or more local cooling circuits of the plurality of reversible heat pump assemblies;
wherein the acts of determining the first set of the plurality of reversible heat pump assemblies and determining the second set of the plurality of reversible heat pump assemblies are based on the determined heating and cooling demands.

4. The method according to claim 3, wherein the time period during which the acts of determining a heating demand from the one or more local heating circuits of the plurality of reversible heat pump assemblies, and determining a cooling demand from the one or more local cooling circuits of the plurality of reversible heat pump assemblies is an already passed time period.

5. The method according to claim 3, wherein the time period during which the acts of determining a heating demand from the one or more local heating circuits of the plurality of reversible heat pump assemblies, and determining a cooling demand from the one or more local cooling circuits of the plurality of reversible heat pump assemblies is a time period to-be.

6. The method according to claim 1, wherein the future time period is at least 10 minutes.

7. The method according to claim 1, wherein upon set in the heating mode for the future time period, the respective reversible heat pump assembly is prohibited to be set in the cooling mode.

8. The method according to claim 1, wherein upon set in the cooling mode for the future time period, the respective reversible heat pump assembly is prohibited to be set in the heating mode.

9. A control server for controlling setting of reversible heat pump assemblies of a district thermal energy distribution system in either a heating mode or a cooling mode, wherein the district thermal energy distribution system is configured to interconnect a plurality of buildings within a city that implements the district thermal energy distribution system enabling distribution of heating and cooling throughout the plurality of buildings, the control server comprising:
a transceiver configured to communicate with the reversible heat pump assemblies wherein the reversible heat pump assemblies are distributed throughout the plurality of buildings; and
a control circuit configured to:
determine, by a heating mode determining function, a first set of the reversible heat pump assemblies of the reversible heat pump assemblies to be set in a heating mode for a future time period;
determine, by a cooling mode determining function, a second set of the reversible heat pump assemblies of the reversible heat pump assemblies to be set in a cooling mode for the future time period, wherein the second set of the reversible heat pump assemblies is separate from the first set of the reversible heat pump assemblies;
generate, by a messaging function, control messages for the reversible heat pump assemblies of the first and second sets; and
send, by the messaging function, the control messages to the reversible heat pump assemblies of the first and second sets.

10. The control server according to claim 9, further comprising a memory, wherein the control circuit is further configured to:
register, in the memory and by a heating consumption determining function, time resolved data relating to heating delivered by one or more of the reversible heat pump assemblies,
determine, by the heating consumption determining function, an amount of heating for one or more of the reversible heat pump assemblies delivered over a past time period,
register, in the memory and by a cooling consumption determining function, time resolved data relating to cooling delivered by one or more of the reversible heat pump assemblies, and
determine, by the cooling consumption determining function, an amount of cooling for one or more of the reversible heat pump assemblies delivered over the past time period;
wherein the heating mode determining function is configured to base the determining of the first set of reversible heat pump assemblies on the, over the past time period, determined amount of heating delivered by the one or more reversible heat pump assemblies; and
wherein the cooling mode determining function is configured to base the determining of the second set of reversible heat pump assemblies on the, over the past time period, determined amount of cooling delivered by the one or more reversible heat pump assemblies.

11. The control server according to claim 9, wherein the control circuit is further configured to:

determine, for a time period and by a heating demand determining function, heating demands from local heating circuits of the reversible heat pump assemblies;

determine, for a time period and by a cooling demand determining function, cooling demands from local cooling circuits of the reversible heat pump assemblies;

wherein the heating mode determining function is configured to base the determining of the first set of reversible heat pump assemblies on heating demands determined by the heating demand determining function; and wherein the cooling mode determining function is configured to base the determining of the second set of reversible heat pump assemblies on cooling demands determined by the cooling demand determining function.

12. A district thermal energy distribution system, comprising:

a distribution grid for a liquid based distribution of heating and cooling, the distribution grid comprising a hot conduit configured to allow heat transfer liquid of a first temperature to flow therethrough and a cold conduit configured to allow heat transfer liquid of a second temperature to flow therethrough, the second temperature is lower than the first temperature;

a plurality of reversible heat pump assemblies connected to the distribution grid, wherein each reversible heat pump assemblies is configured to be selectively set in either a heating mode or a cooling mode by a heat pump assembly mode controller; and a control server according to claim 9.

13. The district thermal energy distribution system according to claim 12, wherein each reversible heat pump assembly comprises a heat pump having a first side and a second side, the heat pump being configured to transfer heat from the first side to the second side or vice versa, the heat pump being configured to allow heat transfer liquid from the distribution grid to flow through the first side, and to allow heat transfer liquid of either one or more local heating circuits or one or more local cooling circuits to flow through the second side, wherein in the heating mode:

heat transfer liquid is allowed to flow from the hot conduit of the distribution grid through the first side and to the cold conduit of the distribution grid, and the heat pump is configured to transfer heat from the first side to the second side, and wherein in the cooling mode:

heat transfer liquid is allowed to flow from the cold conduit of the distribution grid through the first side and to the hot conduit of the distribution grid, and the heat pump is configured to transfer heat from the second side to the first side.

\* \* \* \* \*